May 24, 1938.  LE GRAND S. WHEDON  2,118,456
BRACED SEAT BACK
Filed Oct. 22, 1935
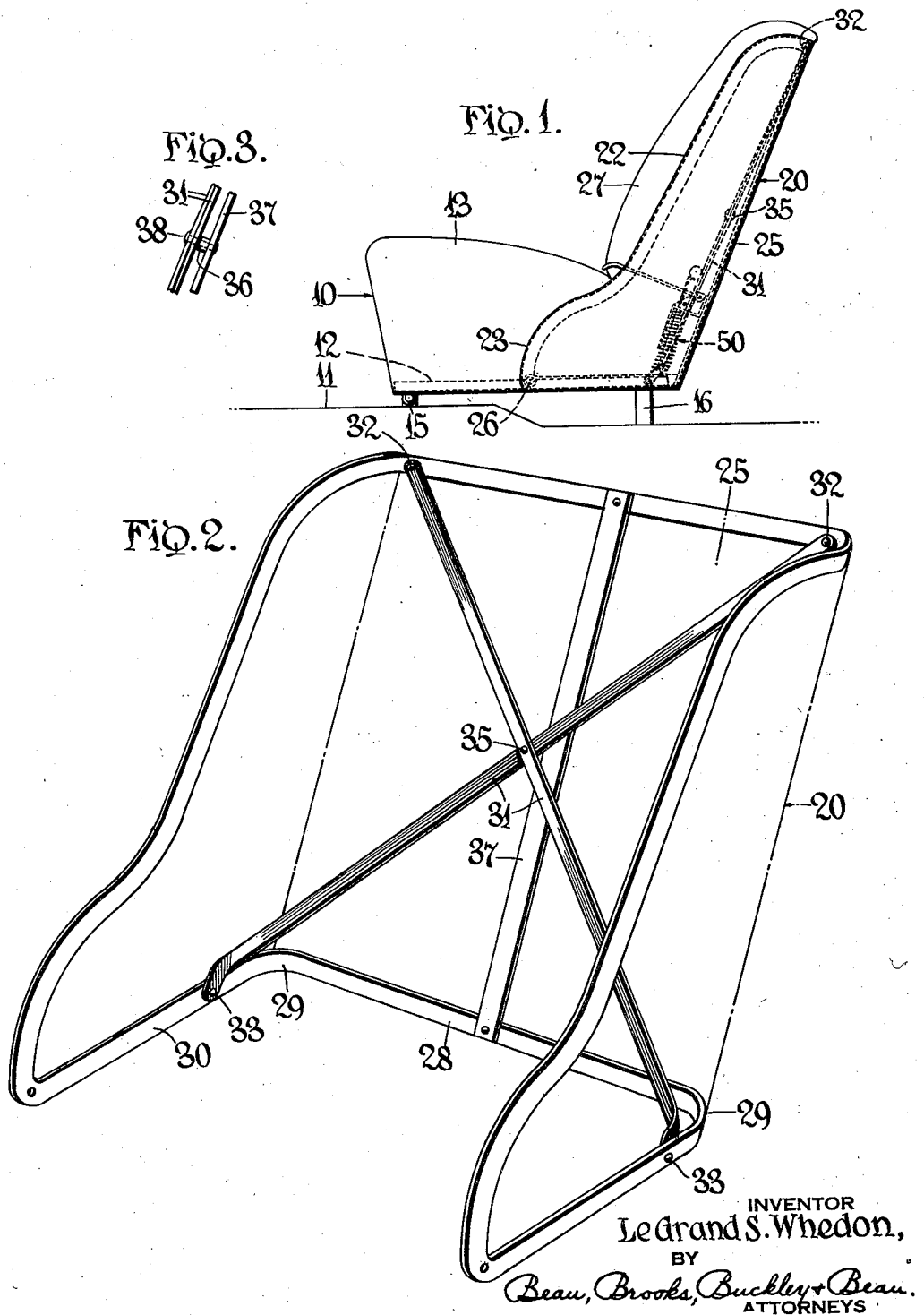
INVENTOR
LeGrand S. Whedon,
BY
Beau, Brooks, Buckley & Beau.
ATTORNEYS Patented May 24, 1938

2,118,456

UNITED STATES PATENT OFFICE 2,118,456

BRACED SEAT BACK

Le Grand S. Whedon, Medina, N. Y.

Application October 22, 1935, Serial No. 46,217

4 Claims. (Cl. 155—197)

This invention relates to seating structure for installation in vehicles, or for other purposes, and it has particular relation to a braced seat back.

One object of the invention is to provide an improved seat back so constructed as to resist and obviate warping, twisting, or other distortion of its elements.

Another object of the invention is to provide an improved structure of braced seat back of shell-like form that is particularly adapted to be pivotally or adjustably mounted upon a seat bottom.

In utilizing seat structures, particularly for motor vehicles, one of the types of seat back includes a shell or frame structure which is substantially U-shape in cross section and the rear portion of the seat bottom fits into the U-configuration. For purposes of adjustment the seat back is pivoted to the seat bottom, and hence, the latter cannot be provided with bracing elements for stiffening the seat back structure. The portion of the seat back between the forwardly extending side flanges was especially susceptible to bending or warping. This invention is concerned with a structure so braced that the U-shape structure can be maintained with all of its advantages and yet is insured against distortion.

In the drawing:

Fig. 1 is a side elevation of a seat installation in which the invention has been incorporated;

Fig. 2 is a perspective of a frame of a seat back and including the features of the invention; and Fig. 3 is a fragmentary side elevation of bracing connections in the back frame structure and in which a different arrangement of bolt connection is shown from that shown in Figs. 1 and 2.

In practicing the invention a seat bottom 10 is provided with a suitable support 11, which can be in the form of a vehicle floor, or other support, according to the type of structure in which the invention is to be installed, and this bottom includes a lower frame 12 supporting a seat cushion 13. The seat bottom 10 can be pivoted, as indicated at 15, adjacent its front extremity to the floor 11 to provide for forwardly tilting action. The rear of the seat bottom is provided with a support or leg 16 resting upon the floor 11.

At the rear portion of the seat bottom 10, a frame or shell 20 composed of metal or other durable material, is formed with side flanges 22, forwardly projecting lower arms 23 extending forwardly beyond the flanges, and a back section 25. Suitable pivotal conections 26 carried by the seat bottom frame 12 at locations intermediate the forward and rear portions of the seat bottom pivotally support the forward ends of the arms 23 of the shell and provide for forward and rearward swinging action of the back of the shell along a forward and upward arc from the rear of the seat bottom. A cushion 27 is mounted in the shell 20 to cooperate with the cushion 13 in the assembled seat structure. Thus the seat back is bodily movable about the pivotal connections 26 within predetermined limits.

The lower marginal portion of the shell 20 is provided with a U-shaped frame member 28 having rear corners 29 preferably rounded to define the junction of the back sections 25 with the side flanges 22, and side portions 30 of the frame member 28 are movable with the back frame adjacent opposite sides of the seat bottom.

A pair of braces or stays 31 extend in crossed relation diagonally across the back section 25 adjacent the inner side of the latter and their upper ends are secured firmly by suitable fastening devices 32 to opposite upper portions of the back section. The lower ends of the braces 31 are secured firmly by means of suitable fastening devices 33 to the forwardly extending side arms 30. The braces 31 cross each other intermediate their ends and they are secured together by means of a rivet 35, or other suitable fastening element. If desired, the braces can be provided with a spacer 36 (Fig. 3) disposed between the crossed portions thereof and a vertical frame member 37 of the seat back. A suitable fastening device 38 rigidly secures the braces 31, spacer 36 and frame member 37 in rigidly assembled relation. Since the bolt 38 is longer than the bolt 35 and performs the function of securing the braces 31 to the frame member 37, as well as securing the braces 31 to one another, these two bolts 35 and 38 are accorded separate reference numerals. The spacer can be omitted and the crossed portions connected directly to the frame member 3.

The braces 31 maintain a rigid assembly among the side flanges 22, arms 23 and back section 25, and any inherent tendency of the back section 25 to be distorted by forces to which it might be subjected, or any tendency of this section to become warped or bent is firmly resisted by the braces. On the other hand the braces are adjacent the back section 25 and the adjustment of the seat back 20 wherein the U-shaped section moves about the rear portion of the seat bottom is not interfered with. The bracing can be installed without materially altering the upholstering of the seating installation.

Although only one form of the invention has been shown and described in detail, it will be apparent to those skilled in the art that the invention is not so limited, but that various changes can be made therein without departing from the spirit of the invention or from the scope of the appended claims.

What is claimed is:

1. In a seat structure having a seat bottom, a seat back including a rear section, side flanges extending forwardly and integrally from the rear section for receiving the rear portion of the seat bottom therebetween, means for pivotally connecting the seat back to the seat bottom, and diagonal braces having end portions secured directly to the rear section adjacent one extremity of the latter, the opposite end portions of the braces being spaced from the surface of the rear section and secured to said side flanges.

2. In a seat structure having a seat bottom, a seat back including a rear section, side flanges extending forwardly and integrally from the rear section for receiving the rear portion of the seat bottom therebetween, means for pivotally connecting the seat back to the seat bottom, a brace extending diagonally from the upper portion of the rear section to a location adjacent the lower portion thereof, means for securing the upper portion of the brace directly to the upper portion of the rear section, and means for securing the lower portion of the brace to one of the side flanges at a location spaced from the surface of the rear section.

3. In a seat structure having a seat bottom, a seat back including a rear section, side flanges extending forwardly and integrally from the rear section for receiving the rear portion of the seat bottom therebetween, means for pivotally connecting the seat back to the seat bottom, a pair of braces extending in crossed relation from the upper portion of the rear section to locations adjacent the lower portion of the latter, means for securing the upper portion of each brace directly to the upper portion of the rear section, and means for securing the lower portion of each brace to one of the side flanges at a location spaced from the surface of the rear section.

4. In a seat back adapted to be pivoted upon a seat bottom and comprising a rear section flanked by forwardly extending integral side flanges, bracing members connected to the upper portion of the rear section and extending therefrom toward the lower portion of the rear section, said bracing members being crossed intermediate their ends and having their crossed portions anchored to the rear section, and means for securing the lower portions of the bracing members to the flanges at locations spaced forwardly of the junction of the rear section with the side flanges.

LE GRAND S. WHEDON.